(12) United States Patent
Fish, III

(10) Patent No.: US 8,977,836 B2
(45) Date of Patent: Mar. 10, 2015

(54) THREAD OPTIMIZED MULTIPROCESSOR ARCHITECTURE

(76) Inventor: Russell H. Fish, III, Dallas, TX (US)

( * ) Notice: Subject to any disclaimer, the term of this patent is extended or adjusted under 35 U.S.C. 154(b) by 0 days.

(21) Appl. No.: 11/702,979

(22) Filed: Feb. 5, 2007

(65) Prior Publication Data

US 2007/0192568 A1 Aug. 16, 2007

Related U.S. Application Data

(60) Provisional application No. 60/764,955, filed on Feb. 3, 2006.

(51) Int. Cl.
| | |
|---|---|
| *G06F 9/38* | (2006.01) |
| *G06F 9/30* | (2006.01) |
| *G06F 9/32* | (2006.01) |
| *G06F 12/08* | (2006.01) |
| *G06F 15/78* | (2006.01) |

(52) U.S. Cl.
CPC .......... *G06F 9/3851* (2013.01); *G06F 9/30138* (2013.01); *G06F 9/30145* (2013.01); *G06F 9/322* (2013.01); *G06F 9/38* (2013.01); *G06F 9/3867* (2013.01); *G06F 9/3885* (2013.01); *G06F 9/3891* (2013.01); *G06F 12/0875* (2013.01); *G06F 15/7846* (2013.01)
USPC ........................................................ 712/14

(58) Field of Classification Search
USPC ........................................................ 712/14
See application file for complete search history.

(56) References Cited

U.S. PATENT DOCUMENTS

| | | | | |
|---|---|---|---|---|
| 3,990,054 | A | * | 11/1976 | Perlowski ...................... 712/247 |
| 4,641,238 | A | * | 2/1987 | Kneib ............................ 710/110 |
| 5,050,075 | A | * | 9/1991 | Herman et al. .................... 707/6 |
| 5,197,140 | A | * | 3/1993 | Balmer .......................... 711/220 |
| 5,440,749 | A | | 8/1995 | Moore et al. .................. 395/800 |
| 5,530,890 | A | | 6/1996 | Moore et al. .................. 395/800 |

(Continued)

FOREIGN PATENT DOCUMENTS

| | | |
|---|---|---|
| AU | 2007212342 | 8/2007 |
| AU | 2008355072 | 5/2012 |

(Continued)

OTHER PUBLICATIONS

M.J. Wirthlin, B. L. Hutchings, and K. L. Gilson. The Nano Processor: A low resource reconfigurable processor. Proceedings of IEEE Workshop on FPGAS for Custom Computing Machines, pp. 23-30, Napa, CA, Apr. 1994.*

(Continued)

*Primary Examiner* — Andrew Caldwell
*Assistant Examiner* — John Lindlof
(74) *Attorney, Agent, or Firm* — Carl F. Melito

(57) ABSTRACT

In one aspect, the invention comprises a system comprising: (a) a plurality of parallel processors on a single chip; and (b) computer memory located on the chip and accessible by each of the processors; wherein each of the processors is operable to process a de minimis instruction set, and wherein each of the processors comprises local caches dedicated to each of at least three specific registers in the processor. In another aspect, the invention comprises a system comprising: (a) a plurality of parallel processors on a single chip; and (b) computer memory located on the chip and accessible by each of the processors, wherein each of the processors is operable to process an instruction set optimized for thread-level parallel processing.

23 Claims, 14 Drawing Sheets

Instruction Op Code Map

| Op Code | Mnemonic | Operation | Carry Effect |
|---|---|---|---|
| 00x xxxxx | LOADI, X | X -> ACC | If zero, C=1 |
| 010 yyyyy | LOADACC, Y | EAY -> ACC | If zero, C=1 |
| 011 yyyyy | STOREACC, Y | ACC -> EAY | No change |
| 100 yyyyy | ADD, Y | ACC + EAY -> EAY | C = carry |
| 101 yyyyy | AND, Y | ACC AND EAY -> EAY | If zero, C=1 |
| 110 yyyyy | XOR, Y | ACC XOR EAY -> EAY | If zero, C=1 |
| 111 yyyyy | INC, Y | EAY + 1 -> EAY | If zero, C=1 | x - binary immediate value
X - HEX immediate value
y - binary value of operand
Y - HEX value of operand
EAY - Effective address indicated by Y

(56) References Cited

U.S. PATENT DOCUMENTS

| | | | | |
|---|---|---|---|---|
| 5,604,915 | A | 2/1997 | Moore et al. | 395/800 |
| 5,659,703 | A | 8/1997 | Moore et al. | 395/436 |
| 5,675,777 | A * | 10/1997 | Glickman | 712/220 |
| 5,752,065 | A * | 5/1998 | Staiger | 712/1 |
| 5,784,584 | A | 7/1998 | Moore et al. | 395/376 |
| 5,809,336 | A | 9/1998 | Moore et al. | 395/845 |
| 5,842,031 | A | 11/1998 | Barker et al. | |
| 6,598,148 | B1 | 7/2003 | Moore et al. | 712/32 |
| 2004/0210720 | A1 * | 10/2004 | Wong et al. | 711/132 |

FOREIGN PATENT DOCUMENTS

| | | |
|---|---|---|
| AU | 2008355072 | 11/2012 |
| AU | 2008355072 | 12/2012 |
| CA | PCA19984 | 3/2013 |
| CN | ZL 200780008047.0 | 3/2009 |
| DE | 1979808 | 8/2007 |
| FR | 1979808 | 8/2007 |
| GB | 1979808 | 8/2007 |
| JP | 4987882 | 5/2012 |
| KR | 1120398 | 1/2012 |
| KR | 1121606 | 1/2012 |
| NL | 1979808 | 8/2007 |
| RU | 2427895 | 8/2011 |
| RU | 2450339 | 5/2012 |

OTHER PUBLICATIONS

Sterling et al., "Gilgamesh: A Multithreaded Processor-In-Memory Architecture for Petaflops Computing".*

Mai et al., "Smart Memories: A Modular Reconfigurable Architecture".*

McGhan et al., "PicoJava: A Direct Execution Engine for Java Bytecode".*

Sterling et al., "Abstract: An Introduction to the Gilgamesh Pim Architecture", Paper No. AIAA-2001-4717, Release A: Copyright 2001 American Institute of Aeronautics & Astro.

Dr. Thomas Sterling, "MyriaCore: When there are too many Cores to Count", LSU Center for Computation & Technology (ORAP Forum on Petaflops Architectures), Jun. 7, 2007.

* cited by examiner

Registers and Data Paths

Instruction Op Code Map

| Op Code | Mnemonic | Operation | Carry Effect |
|---|---|---|---|
| 00x xxxxx | LOADI, X | X -> ACC | If zero, C=1 |
| 010 yyyyy | LOADACC, Y | EAY -> ACC | If zero, C=1 |
| 011 yyyyy | STOREACC, Y | ACC -> EAY | No change |
| 100 yyyyy | ADD, Y | ACC + EAY -> EAY | C = carry |
| 101 yyyyy | AND, Y | ACC AND EAY -> EAY | If zero, C=1 |
| 110 yyyyy | XOR, Y | ACC XOR EAY -> EAY | If zero, C=1 |
| 111 yyyyy | INC, Y | EAY + 1 -> EAY | If zero, C=1 | x - binary immediate value
X - HEX immediate value
y - binary value of operand
Y - HEX value of operand
EAY - Effective address indicated by Y

Fig. 2

Forward Branches

```
      MSB                                    LSB
PC    xxxxxxxx   xxxxxxxx      xxwwwwww
ACC   00000000   00000000      00zzzzzz
```

Forward branch is taken, zzzzzz → wwwwww if wwwwww > zzzzzz,
then xxxxxxxx xxxxxxxx xx + 1  →  xxxxxxxx xxxxx xx

Fig. 2A

Effective Addresses

| Register | Effective Address | Special Operations |
|---|---|---|
| 00000 | PC | All operations conditional on C=1 |
| 00001 | PC | |
| 00010 | ACC | |
| 00011 | (ACC) | |
| 00100 | S | |
| 00101 | (S) | |
| 00110 | (S) autoincrement | |
| 00111 | (S) autodecrement | |
| 01000 | X | |
| 01001 | (X) | |
| 01010 | (X) autoincrement | |
| 01011 | (X) autodecrement | |
| 01100 | Y | |
| 01101 | (Y) | |
| 01110 | (Y) autoincrement | |
| 01111 | (Y) autodecrement | |
| 10000 | Register 10 | |
| 10001 | Register 11 | |
| 10010 | Register 12 | |
| 10011 | Register 13 | |
| 10100 | Register 14 | |
| 10101 | Register 15 | |
| 10110 | Register 16 | |
| 10110 | Register 17 | |
| 10111 | Register 18 | |
| 11000 | Register 19 | |
| 11001 | Register 1A | |
| 11010 | Register 1B | |
| 11011 | Register 1C | |
| 11100 | Register 1D | |
| 11101 | Register 1E | |
| 11111 | Register 1F | |

Fig. 3

Cache Management States

Additional Functionality

Processor Availability Table

| Processor | available_flag | done_flag | Interrupt Vector | time_started | error_flag |
|---|---|---|---|---|---|
| 3F | | | | | |
| 3E | | | | | |
| 3D | | | | | |
| 3C | | | | | |
| 3B | | | | | |
| 3A | | | | | |
| 30 | | | | | |
| 2F | | | | | |
| 2E | | | | | |
| ↕ | | | | | |
| 08 | | | | | |
| 07 | | | | | |
| 06 | | | | | |
| 05 | | | | | |
| 04 | | | | | |
| 03 | | | | | |
| 02 | | | | | |
| 01 | | | | | |

Fig. 9

Factoring Computation of Imagemap

| processor 1 | processor 2 | processor 3 | processor 4 | processor 5 | processor 6 |
|---|---|---|---|---|---|
| processor 7 | processor 8 | processor 10 | processor 11 | processor 12 | processor 13 |
| processor 14 | processor 15 | processor 16 | processor 17 | processor 18 | processor 19 |
| processor 20 | processor 21 | processor 22 | processor 23 | processor 24 | processor 25 |

Fig. 11

Factoring Computation Memory Map

Possible Floorplan of 64 Processor System

THREAD OPTIMIZED MULTIPROCESSOR ARCHITECTURE

CROSS REFERENCE TO RELATED APPLICATIONS

This application claims priority to U.S. Provisional Patent Application No. 60/764,955, filed Feb. 3, 2006. The entire contents of that provisional application are incorporated herein by reference.

BACKGROUND AND SUMMARY

Computer speed may be increased using two general approaches: increase instruction execution speed or do more instruction execution in parallel. As instruction execution speed approaches the limits of electron mobility in silicon, parallelism becomes the best alternative to increasing computer speed.

Previous attempts at parallelism have included:

1. Overlapping next instruction fetching with current instruction execution.

2. Instruction pipelining. An instruction pipeline breaks each instruction into as many pieces as possible and then attempts to map sequential instructions into parallel execution units. Theoretical maximum improvement is seldom achieved due to the inefficiencies of multi-step instructions, inability of many software programs to provide enough sequential instructions to keep the parallel execution units filled, and the large time penalty paid when a branch, loop, or case construct is encountered requiring the refilling of the execution units.

3. Single instruction multiple data or SIMD. This type of technique is found in the Intel SSE instruction set, as implemented in the Intel Pentium 3 and other processors. In this technique, a single instruction executes on multiple data sets. This technique is useful only for special applications such as video graphics rendering.

4. Hypercube. This technique employs large two-dimensional arrays and sometimes three-dimensional arrays of processors and local memory. The communications and interconnects necessary to support these arrays of processors inherently limits them to very specialized applications.

A pipeline is an instruction execution unit consisting of multiple sequential stages that successively perform a piece of an instruction's execution, such as fetch, decode, execute, store, etc. Several pipelines may be placed in parallel, such that program instructions are fed to each pipeline one after another until all pipelines are executing an instruction. Then the instruction filling repeats with the original pipeline. When N pipelines are filled with instructions and executing, the performance effect is theoretically the same as an N times increase in execution speed for a single execution unit.

Successful pipelining depends upon the following:

1. An instruction's execution must be able to be defined as several successive states.

2. Each instruction must have the same number of states.

3. The number of states per instruction determines the maximum number of parallel execution units.

Since pipelining can achieve performance increases based on the number of parallel pipelines, and since the number of parallel pipelines is determined by the number of states in an instruction, pipelines encourage complex multi-state instructions.

Heavily pipelined computers very seldom achieve performance anywhere near the theoretical performance improvement expected from the parallel pipeline execution units. Several reasons for this pipeline penalty include:

1. Software programs are not made up of only sequential instructions. Various studies indicate changes of execution flow occur every 8-10 instructions. Any branch that changes program flow upsets the pipeline. Attempts to minimize the pipeline upset tend to be complex and incomplete in their mitigation.

2. Forcing all instructions to have the same number of states often leads to execution pipelines that satisfy the requirements of the lowest common denominator (i.e., the slowest and most complex) instructions. Because of the pipeline, all instructions are forced into the same number of states, regardless of whether they need them or not. For example, logic operations (such as AND or OR) execute an order of magnitude faster than an ADD, but often both are allocated the same amount of time for execution.

3. Pipelines encourage multi-state complex instructions. Instructions that might require two states are typically stretched to fill 20 states because that is the depth of the pipeline. (The Intel Pentium 4 uses a 20 state pipeline.)

4. The time required for each pipeline state must account for propagation delays through the logic circuitry and associated transistors, in addition to the design margins or tolerances for the particular state.

5. Arbitration for pipeline register and other resource access often reduces performance due to the propagation delays of the transistors in the arbitration logic.

6. There is an upper limit on the number of states into which an instruction may be split before the additional state actually slows down execution, rather than speeds it up. Some studies have suggested that the pipeline architecture in the last generation of Digital Equipment Corporation's Alpha processor exceeded that point and actually performed slower that the previous, shorter pipelined version of the processor.

Splitting Apart the Pipelines

One perspective to re-factoring CPU design is to think of pipelined execution units that are then split into multiple (N) simplified processors. (Registers and some other logic may need to be duplicated in such a design.) Each of the N simplified processors would have the following advantages over the above-discussed pipelined architectures:

1. No pipeline stalls. No branch prediction necessity.

2. Instructions could take as much or as little time as they need, rather than all being allocated the same execution time as the slowest instruction.

3. Instructions could be simplified by reducing the necessary execution states, thereby reducing the pipeline penalty.

4. Each state eliminated from the pipeline could eliminate propagation delays and remove design margins necessary for the state.

5. Register arbitration could be eliminated.

Furthermore, a system with N simplified processors could have the following advantages over a pipelined CPU:

1. The limit of maximum pipeline parallelism would be eliminated.

2. Unlike a pipelined processor, multiple standalone processors could be selectively powered down to reduce power consumption when not in use.

Other Problems with Current Approaches to Parallelism

Many implementations of parallelism succumb to the limits of Amdahl's Law. Acceleration through parallelism is limited by overhead due to non-serializable portions of the problem. In essence, as the amount of parallelism increases, the communications necessary to support it overwhelms the gains due to the parallelism.

Stoplight Sitting at Redline

Another inefficiency of current processors is the inability of scaling the computing power to meet the immediate computing demand. Most computers spend most of their time waiting for something to happen. They wait for I/O, for the next instruction, for memory access, or sometimes human interface. This waiting is an inefficient waste of computing power. Furthermore, the computer time spent waiting often results in increased power consumption and heat generation.

The exceptions to the waiting rule are applications like engine controllers, signal processors, and firewall routers. These applications are excellent candidates for parallelism acceleration due to the predefined nature of the problem sets and solution sets. A problem that requires the product of N independent multiplications may be solved faster using N multipliers.

The perceived performance of a general purpose computer is really its peak performance. The closest a general purpose computer gets to being busy is running a video game with a rapid screen refresh, compiling a large source file, or searching a database. In an optimal world, the video rendering would be factored into special purpose, shading, transforming, and rendering hardware. One method of factoring the programming to such special purpose hardware is the use of "threads."

Threads are independent programs that are self contained and infrequently communicate data with other threads. A common use of threads is to collect data from slow realtime activity and provide the assembled results. A thread might also be used to render a change on a display. A thread may transition through thousands or millions of states before requiring further interaction with another thread. Independent threads present an opportunity for increased performance through parallelism.

Many software compilers support the generation and management of threads for the purposes of factoring the software design process. The same factoring will support multiple CPU parallel processing via the technique of Thread Level Parallelism implemented in a Thread Optimized Microprocessor (TOMI) of the preferred embodiment.

Thread Level Parallelism

Threading is a well understood technique for factoring software programs on a single CPU. Thread level parallelism can achieve program acceleration through use of a TOMI processor.

One significant advantage of a TOMI processor over other parallel approaches is that a TOMI processor requires minimal changes to current software programming techniques. New algorithms do not need to be developed. Many existing programs may need to be recompiled, but not substantially rewritten.

An efficient TOMI computer architecture should be built around a large number of simplified processors. Different architectures may be used for different types of computing problems.

Fundamental Computer Operations

For a general purpose computer, the most common operations in order of declining frequency are: Loads and stores; Sequencing; and Math and logic.

Load and Store

The parameters of LOAD and STORE are the source and destination. The power of the LOAD and STORE is the range of source and destination (for example, 4 Gbytes is a more powerful range than 256 bytes). Locality relative to the current source and destination is important for many data sets. Plus 1, minus 1 are the most useful. Increasing offsets from the current source and destination are progressively less useful.

LOAD and STORE may also be affected by the memory hierarchy. A LOAD from storage may be the slowest operation a CPU can perform.

Sequencing

Branches and loops are the fundamental sequencing instructions. Instruction sequence changes based on a test is the way computers make decisions.

Math and Logic

Math and logic operations are the least used of the three operations. Logic operations are the fastest operations a CPU can perform and can require as little as a single logic gate delay. Math operations are more complex since higher order bits depend on the results of lower order bit operations. A 32-bit ADD can require at least 32 gate delays, even with carry lookahead. MULTIPLY using a shift and add technique can require the equivalent of 32 ADDs.

Tradeoffs of Instruction Size

The perfect instruction set would consist of op-codes that are large enough to select infinite possible sources, destinations, operations, and next instructions. Unfortunately the perfect instruction set op-codes would be infinitely wide and the instruction bandwidth would therefore be zero.

Computer design for high-instruction bandwidth involves the creation of an instruction set with op-codes able to efficiently define the most common sources, destinations, operations, and next instructions with the fewest op-code bits.

Wide op-codes lead to high instruction bus bandwidth requirements and the resulting architecture will be quickly limited by the Von Neumann bottleneck, wherein the computer's performance is limited by the speed with which it fetches instructions from memory.

If a memory bus is 64 bits wide, one could fetch a single 64-bit instruction, two 32-bit instructions, four 16-bits instructions, or eight 8-bit instructions in each memory cycle. A 32-bit instruction had better be twice as useful as a 16-bit instruction since it cuts the instruction bandwidth in half.

A major objective of instruction set design is to reduce instruction redundancy. In general an optimized efficient instruction set takes advantage of the locality of both instructions and data. The easiest instruction optimizations have long since been done. For most computer programs, the most likely next instruction is the sequentially next instruction in memory. Therefore instead of every instruction having a next instruction field, most instructions assume the next instruction is the current instruction+1. It is possible to create an architecture with zero bits for source and zero bits for destination.

Stack Architectures

Stack architecture computers are also called zero operand architectures. A stack architecture performs all operations based on the contents of a push down stack. A two operand operation would require both operands be present on the stack. When the operation executes, both operands would be POP'd from the stack, the operation would be performed, and the result would be PUSH'd back on the stack. Stack architecture computers can have very short op-codes since the source and destination are implied as being on the stack.

Most programs require the contents of global registers that may not always be available on the stack when needed. Attempts to minimize this occurrence have included stack indexing that allows accessing operands other than those on the top of the stack. Stack indexing requires either additional op-code bits resulting in larger instructions or additional operations to place the stack index value on the stack itself. Sometimes one or more additional stacks are defined. A better but not optimal solution is a combination stack/register architecture.

Stack architecture operation is also often redundant in ways that defy obvious optimizations. For example, each POP and PUSH operation has the potential to cause a time wasting memory operation as the stack is manipulated in memory. Furthermore, the stack operation may consume an operand that may be immediately needed for the next operation, thereby requiring operand duplication with the potential of yet another memory operation. Take for example, the operation of multiplying all the elements of a one dimensional array by 15.

On a stack architecture, this is implemented by:
1. PUSH start address of array
2. DUPLICATE address (So we have the address to store the result to the array.)
3. DUPLICATE address (So we have the address to read from the array.)
4. PUSH INDIRECT (PUSH the contents of the array location pointed to by the top of stack)
5. PUSH 15
6. MULTIPLY (15 times the array contents we read in line 3)
7. SWAP (Get the array address on the top of the stack for the next instruction.)
8. POP INDIRECT (POPs the multiplication result and stores it back to the array.)
9. INCREMENT (Point to the next array item.)
10. Go to step 2 until the array is done.

The loop counter in line 9 would require an additional parameter. In some architectures, this parameter is stored on another stack.

On a hypothetical register/accumulator architecture, the example is implemented by:
1. STORE POINTER start address of array
2. READ POINTER (Read the contents of the address pointed to into an accumulator.)
3. MULTIPLY 15
4. STORE POINTER (Store the result into the address pointed to.)
5. INCREMENT POINTER
6. Go to line 2 until the array is done.

Compare the nine steps for the stack architecture versus the five steps for the register architecture for the above example. Furthermore, the stack operation has at least 3 possible opportunities for an extra memory access due to stack operation. The loop control of the hypothetical register/accumulator architecture could easily be handled in a register.

Stacks are useful for evaluating expressions and are used as such in most compilers. Stacks are also useful for nested operations such as function calls. Most C compilers implement function calls with a stack. However, without supplementing by general purpose storage, a stack architecture requires lots of extra data movement and manipulation. For optimization purposes, stack PUSH and POP operations should also be separated from math and logic operations. But as can be seen from the example above, stacks are particularly inefficient when loading and storing data repeatedly, since the array addresses are consumed by the PUSH INDIRECT and POP INDIRECT.

In one aspect, the invention comprises a system comprising: (a) a plurality of parallel processors on a single chip; and (b) computer memory located on the chip and accessible by each of the processors; wherein each of the processors is operable to process a de minimis instruction set, and wherein each of the processors comprises local caches dedicated to each of at least three specific registers in the processor.

In various embodiments: (1) the size of each of the local caches is equivalent to one row of random access memory on the chip; (2) the at least three specific registers with an associated cache include an instruction register, source register, and destination register; (3) the de minimis instruction set consists of seven instructions; (4) each of the processors is operable to process a single thread; (5) an accumulator is an operand for every instruction, except an increment instruction; (6) a destination for each instruction is always an operand register; (7) three registers auto-increment and three registers auto-decrement; (8) each instruction requires only one clock cycle to complete; (9) the instruction set comprises no BRANCH instruction and no JUMP instruction; (10) each instruction is at most 8 bits in length; and (11) a single master processor is responsible for managing each of the parallel processors.

In another aspect, the invention comprises a system comprising: (a) a plurality of parallel processors on a single chip; and (b) computer memory located on the chip and accessible by each of the processors, wherein each of the processors is operable to process an instruction set optimized for thread-level parallel processing.

In various embodiments: (1) each of the processors is operable to process a de minimis instruction set; (2) each of the processors comprises local caches dedicated to each of at least three specific registers in the processor; (3) the size of each of the local caches is equivalent to one row of random access memory on the chip; (4) the at least three specific registers include an instruction register, source register, and destination register; (5) the de minimis instruction set consists of seven instructions; (6) each of the processors is operable to process a single thread; and (7) a single master processor is responsible for managing each of the parallel processors.

In another aspect, the invention comprises a method of thread-level parallel processing utilizing a plurality of parallel processors, a master processor, and a computer memory on a single chip, wherein each of the plurality of processors is operable to process a de minimis instruction set and to process a single thread, comprising: (a) allocating local caches to each of three specific registers in each of the plurality of processors; (b) allocating one of the plurality of processors to process a single thread; (c) processing each allocated thread by the processors; (d) processing the results from each thread processed by the processors; and (e) de-allocating one of the plurality of processors after a thread has been processed.

In various embodiments: (1) the de minimis instruction set consists of seven instructions; (2) instruction in the de minimis instruction set is at most 8 bits in length; and (3) each instruction in the de minimis instruction set is processed in one clock cycle.

The invention is not limited to the embodiments described herein, which are intended to be exemplary only.

BRIEF DESCRIPTION OF THE DRAWINGS

FIG. 2 an exemplary instruction set.
FIG. 2A shows a forward branch in operation.
FIG. 3 illustrates effective addresses of different addressing modes.
FIG. 9 depicts an exemplary process availability table.
FIG. 11 depicts exemplary factoring.

DETAILED DESCRIPTION OF CERTAIN EMBODIMENTS

The TOMI architecture of at least one embodiment of the present invention preferably uses the minimum logic possible to operate as a general purpose computer. The most common operations are given priority. Most operations are visible, regular, and available for compiler optimization.

Figure 1:
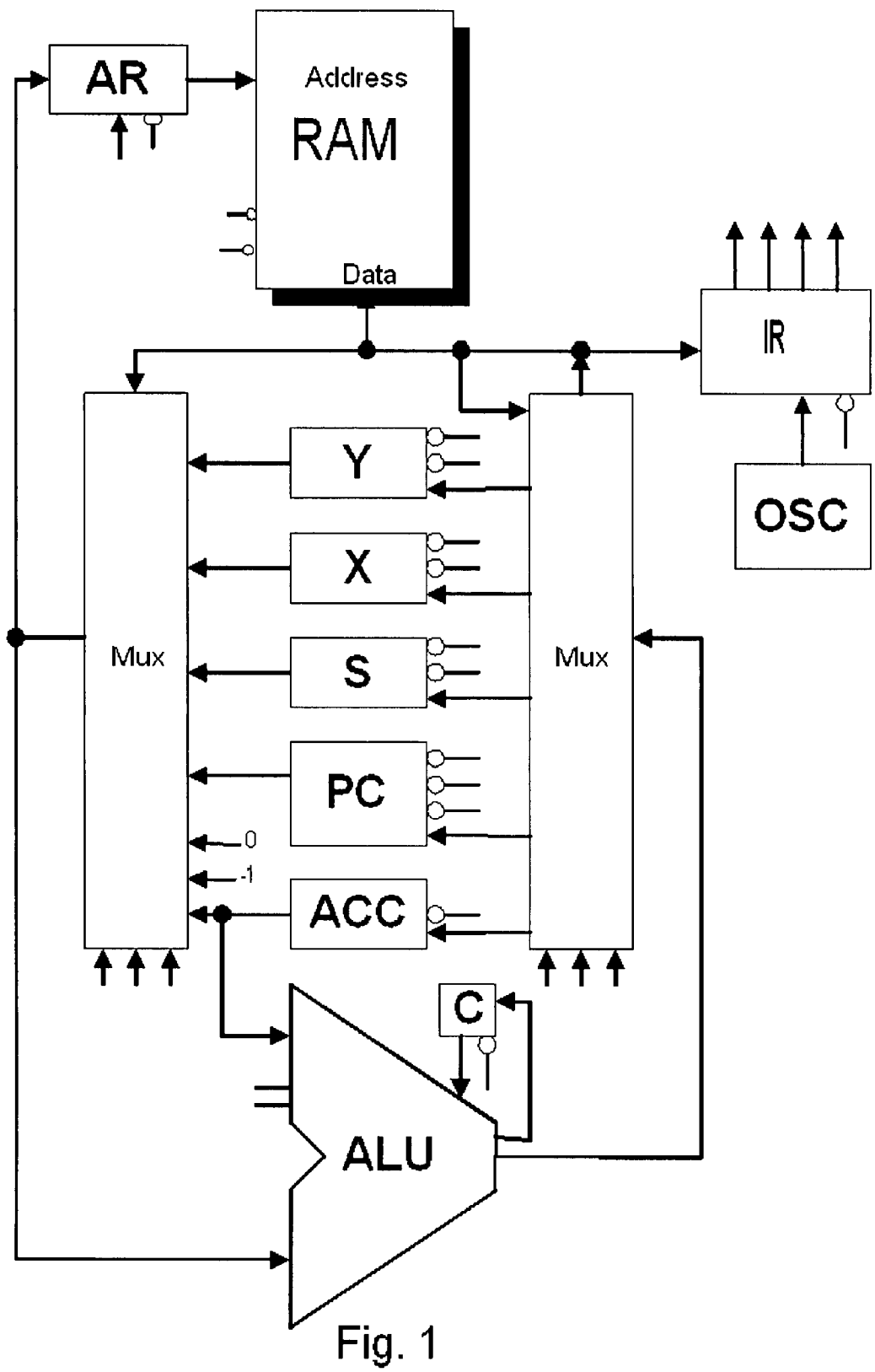
FIG. 1 depicts exemplary TOMI architecture of one embodiment.

In one embodiment, the TOMI architecture is a variation on accumulator, register, and stack architectures, as illustrated in FIG. 1. In this embodiment:

1. Like an accumulator architecture, the accumulator is always one of the operands, except for the increment instruction.
2. Like a register architecture, the destination is always one of the operand registers.
3. The accumulator and program counter are also in the register space and may therefore be operated on.
4. Three special registers auto-increment and auto-decrement and are useful for creating stacks and streams of input and output.
5. All operations require a single clock cycle (and two states: clock high, clock low).
6. All instructions are 8-bits in length, simplifying and speeding instruction decode.
7. There is no BRANCH or JUMP instruction.
8. There are just seven instructions enabling 3 bits of operator selection from an 8-bit instruction, as illustrated by FIG. 2.

Some of the benefits of the preferred embodiment include:
1. All operations run at the maximum speed allowed by the logic, rather than being constricted by the equality necessitated by a pipeline. Logic operations are fastest. Math operations are next fastest. Operations requiring memory access are slowest.
2. The architecture scales to any data width, limited only by package pins, adder carry times, and usefulness.
3. The architecture is near the minimum possible functionality necessary to perform all the operations of a general purpose computer.
4. The architecture is very transparent, very regular, and most operations are available to the optimizing compiler.

The architecture is designed to be simple enough to be replicated numerous times on a single monolithic chip. One embodiment embeds multiple copies of the CPU monolithically with memory. A 32-bit CPU may be implemented in fewer than 1,500 gates, with most of the gates defining the registers. Nearly 1,000 TOMI CPUs of a preferred embodiment can be implemented using the same number of transistors as a single Intel Pentium 4.

Instruction Set

The seven instructions in the instruction set are shown in FIG. 2 along with their bit mappings. Each instruction preferably consists of a single 8-bit word.

Addressing Modes

FIG. 3 illustrates the effective addresses of the different addressing modes.
The addressing modes are:
Immediate
Register
Register Indirect
Register Indirect Auto-increment
Register Indirect Auto-decrement Special Cases Register 0 and Register 1 both refer to the Program Counter (PC). All operations with Register 0 (the PC) as the operand are conditional on the accumulator carry bit (C) equals 1. If C=1, the old value of PC is swapped into the accumulator (ACC). All operations with Register 1 (the PC) as the operand are unconditional.

There is No Branch

Branch and Jump operations are usually a problem for CPU designers because they require many bits of precious op-code space. The branching function may be created by loading the desired branch address into the ACC using LOADACC, xx and then using the STOREACC, PC instruction to effect the branch. A branch may be made conditional on the state of C by storing to Register 0.

Skip

A skip may be created by executing INC, PC. Execution will require two cycles, one for the current PC increment cycle to complete and one for the INC. A skip may be made conditional on the state of C by incrementing Register 0.

A Relative Branch

A relative branch may be created by loading the desired offset into the ACC and then executing the ADD, PC instruction. A relative branch may be made conditional on the state of C by adding to Register 0.

Forward Branches

Forward branches are more useful than rearward branches since the location of the rearward branches necessary for loops is easily captured by saving the PC as the program steps through the top of the loop the first time.

A more efficient forward branch than the relative branch may be created by loading the least significant bits of the branch endpoint into the ACC and then storing to the PC. Since the PC can be accessed both conditionally or unconditionally depending upon the use of Register 0 or Register 1, the forward branch may also be conditional or unconditional by the selection of the PC register (Register 0 or Register 1) as the destination operand.

For example:
LOADI, #1C
STOREACC, PC

If the most significant bits of the ACC are zero, only the least significant 6 bits are transferred to the PC register. The most significant bits of the register remain unchanged if the least significant 6 bits of the current PC register are smaller than the ACC value to be loaded. If the least significant 6 bits of the current PC register are greater than the ACC value to be loaded, the current PC register is incremented, starting with the 7th bit.

This effectively allows branches of up to 31 instructions forward. This method of forward branching should be used whenever possible because not only does it require 2 instructions versus 3 instructions for the relative branch, but it does not require a pass through the adder, which is one of the slowest operations. FIG. 2A shows the forward branch in operation.

Loops

The top of a loop may be saved using LOADACC, PC. The resulting pointer to the top of the looping construct may then be stored in a register or pushed into one of the autoindexing registers. At the bottom of the loop, the pointer may be retrieved with LOADACC, EA and restored to the PC using STOREACC, PC, thereby causing a backwards loop. The loop may be made conditional on the state of C by storing to Register 0 thereby causing a conditional backwards loop.

Self Modifying Code

It is possible to write self-modifying code using STOREACC, PC. An instruction may be created or fetched into the ACC and then stored into the PC where it will execute as the next instruction. This technique may be used to create a CASE construct.

Assume a jump table array in memory consisting of N addresses and base address of JUMPTABLE. For convenience, JUMPTABLE might be in low memory so its address can be created with LOADI or a LOADI following by one or more right shifts, ADD, ACC.

Assume that the index into the jump table is in ACC and the base address of the jump table is in a general purpose register named JUMPTABLE:

| | |
|---|---|
| ADD, JUMPTABLE | Add the index to the base address of the jump table. |
| LOADACC, (JUMPTABLE) | Load the indexed address |
| STOREACC, PC | Execute the jump. |

If low order memory starting at 0000 is allocated to system calls, each system call may be executed as follows where SPECIAL_FUNCTION is the name of an immediate operand 0-63:

| | |
|---|---|
| LOADI, SPECIAL_FUNCTION | Load the system call number |
| LOADACC, (ACC) | Load the address of the system call |
| STOREACC, PC | Jump to the function |

Right Shift

The basic architecture does not envision a right shift operation. Should such an operation be required, the solution of a preferred embodiment is to designate one of the general purpose registers as the "right shift register." A STOREACC, RIGHTSHIFT would store the ACC right shifted a single position into the "right shift register" where its value could be read with LOADACC, RIGHTSHIFT.

Architectural Scalability

Figure 4:
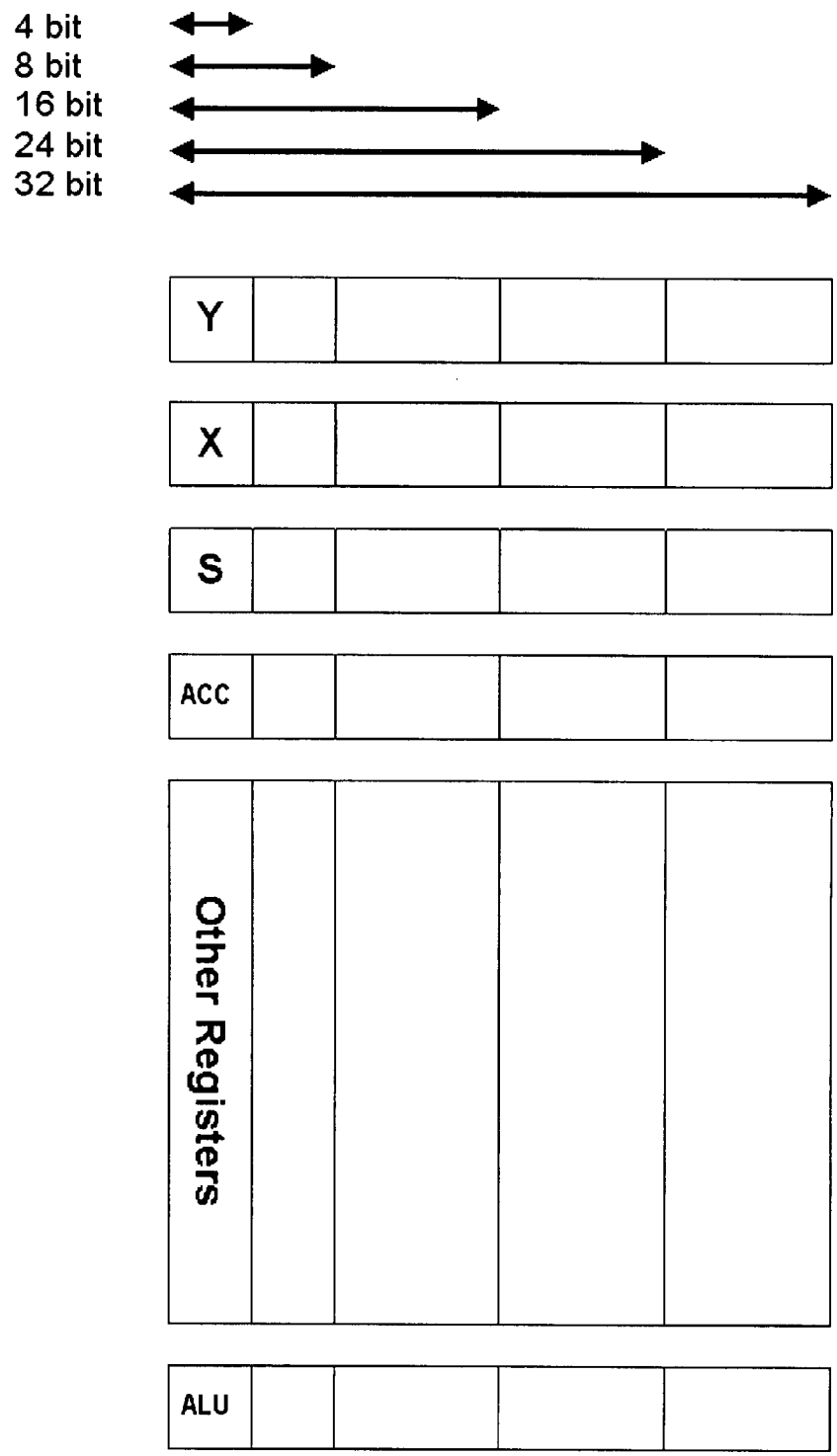
FIG. 4 illustrates how data paths from 4-32 bits are easily created.

The TOMI architecture preferably features 8-bit instructions, but the data width need not be restricted. FIG. 4 illustrates how any width data paths from 4-32 bits are easily created. Creating larger width data handling only requires increasing the width of the register set, the internal data paths, and the ALU to the desired widths. The upper bound of the data path is only limited by the carry propagation delay of the adder and the transistor budget.

The preferred TOMI architecture is implemented as a Von Neumann memory configuration for simplicity, but a Harvard architecture implementation (with separate data and instruction buses) is also possible.

Common Math Operations

Two's complement math can be done several ways. A general purpose register may be preconfigured as all "1s" and named ALLONES. The operand will be assumed to be in a register named OPERAND:

| | |
|---|---|
| LOADACC, ALLONES | |
| XOR, OPERAND | |
| INC, OPERAND | The "2s" complement is left in OPERAND. |

Common Compiler Constructions

Most computer programs are generated by a compiler. Therefore, a useful computer architecture should be adept at common compiler constructions.

A C compiler will normally maintain a stack for passing parameters to function calls. The S, X, or Y registers may be used as the stack pointer. The function call will push the parameters onto one of the autoindexing registers acting as the stack, using, for example: STOREACC, (X)+. Upon entering the function the parameters will be POP'd into general purpose registers for use.

Stack Relative Addressing

There will be times when there are more elements passed in the function call than can conveniently fit in the general purpose registers. For the purposes of the following example it is assumed that a stack push operation decrements the stack. If S is being used as the stack register, to read the Nth item relative to the top of the stack:

LOADI, N
    STOREACC, X
    LOADACC, S
    ADD, X
    LOADACC, (X)

Indexing into an Array

Upon entry into the array function, the base address of the array is located in a general purpose register named ARRAY. To read the Nth element in the array:

LOADI, N
    STOREACC, X
    LOADACC, ARRAY
    ADD, X
    LOADACC, (X)

Indexing into an N Word Element Array

Sometimes an array will be allocated for elements N words wide. The base address of the array is located in a general purpose register named ARRAY. To access the first word of the Nth element in a 5 word wide array:

| | |
|---|---|
| LOADI, N | |
| STOREACC, X | Store in temporary register |
| ADD, ACC | Multiply by 2 |
| ADD, ACC | By 2 again = 4 |
| ADD, X | plus 1 = 5 |
| LOADACC, ARRAY | |
| ADD, X | plus the base address of the array |
| LOADACC, (X) | |

Local TOMI Caching

A cache is memory smaller in size and faster in access than the main memory. The reduced access time and the locality of program and data accesses allow cache operations to increase performance of a preferred TOMI processor for many operations. From another perspective, a cache increases parallel processing performance by increasing independence of a TOMI processor from main memory. The relative performance of cache to main memory and the number of cycles the TOMI processor can execute before requiring another main memory load or store to or from cache determine the amount of performance increase due to TOMI processor parallelism.

Figure 5:
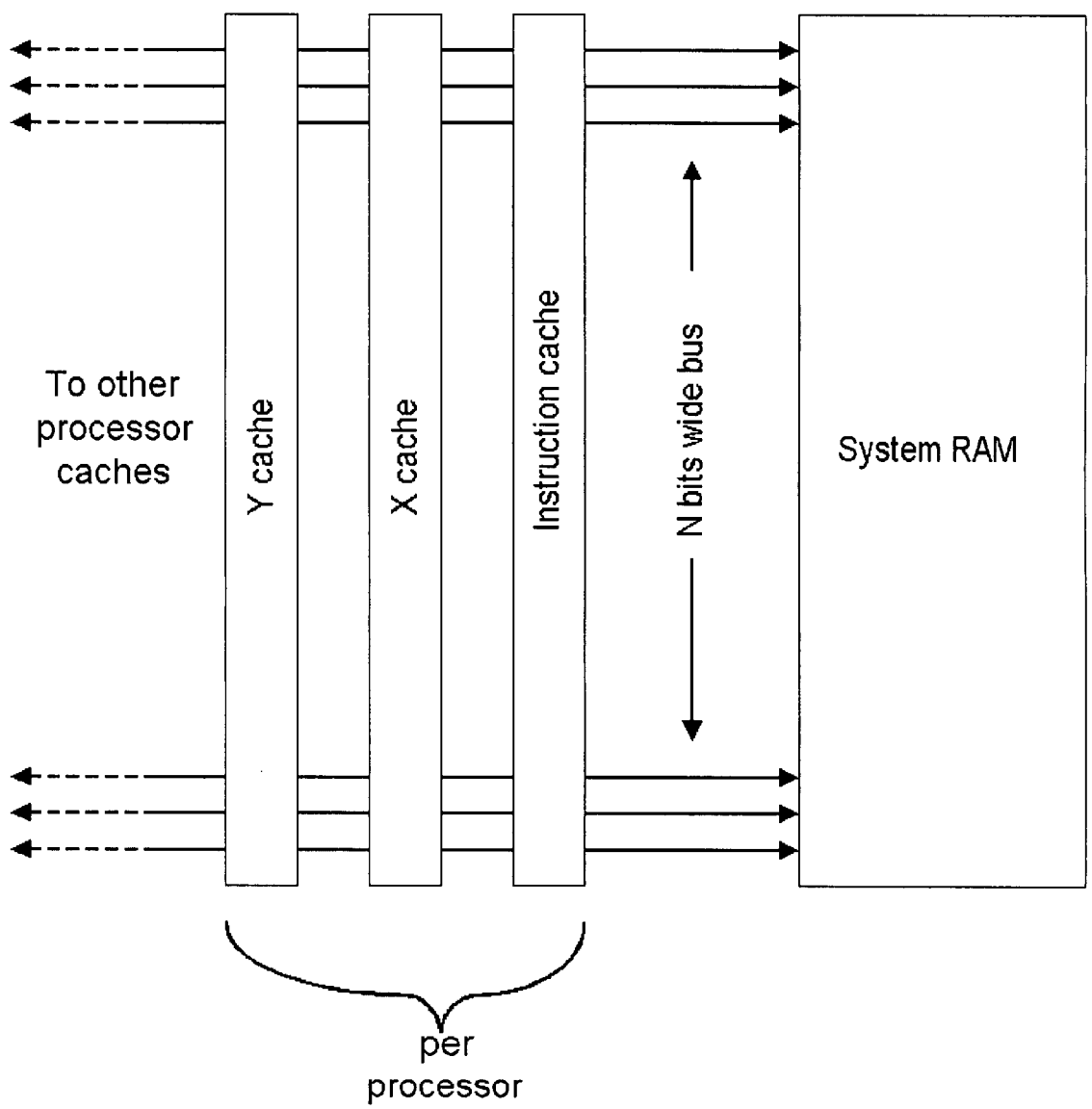
FIG. 5 depicts exemplary local caches.

TOMI local caches enhance the performance increase due to TOMI processor parallelism. Each TOMI processor preferably has three associated local caches, as illustrated in FIG. 5:

Instruction—associated with the PC
    Source—associated with the X register
    Destination—associated with the Y register The optimal dimensions of these caches are application dependent. A typical embodiment may require 1024 bytes for each cache. In other words, 1024 instructions, and 256 32-bit words of source and destination. At least two factors determine the optimum size of the caches. First is the number of states the TOMI processor can cycle before another cache load or store operation is required. Second is the cost of the cache load or store operation from main memory relative to the number of TOMI processor execution cycles possible during the main memory operation.

Embedding TOMI Processors in RAM

In one embodiment, a wide bus connects the large embedded memory to the caches, so a load or store operation to the caches can occur quickly. With TOMI processors embedded in RAM, a load or store of an entire cache would consist of a single memory cycle to a RAM column. In one embodiment, the embedded memory will be responding to requests of 63 TOMI processors, so the response time of a cache load or store for one TOMI processor may be extended while the load or store of another TOMI processor cache completes.

Figure 6:
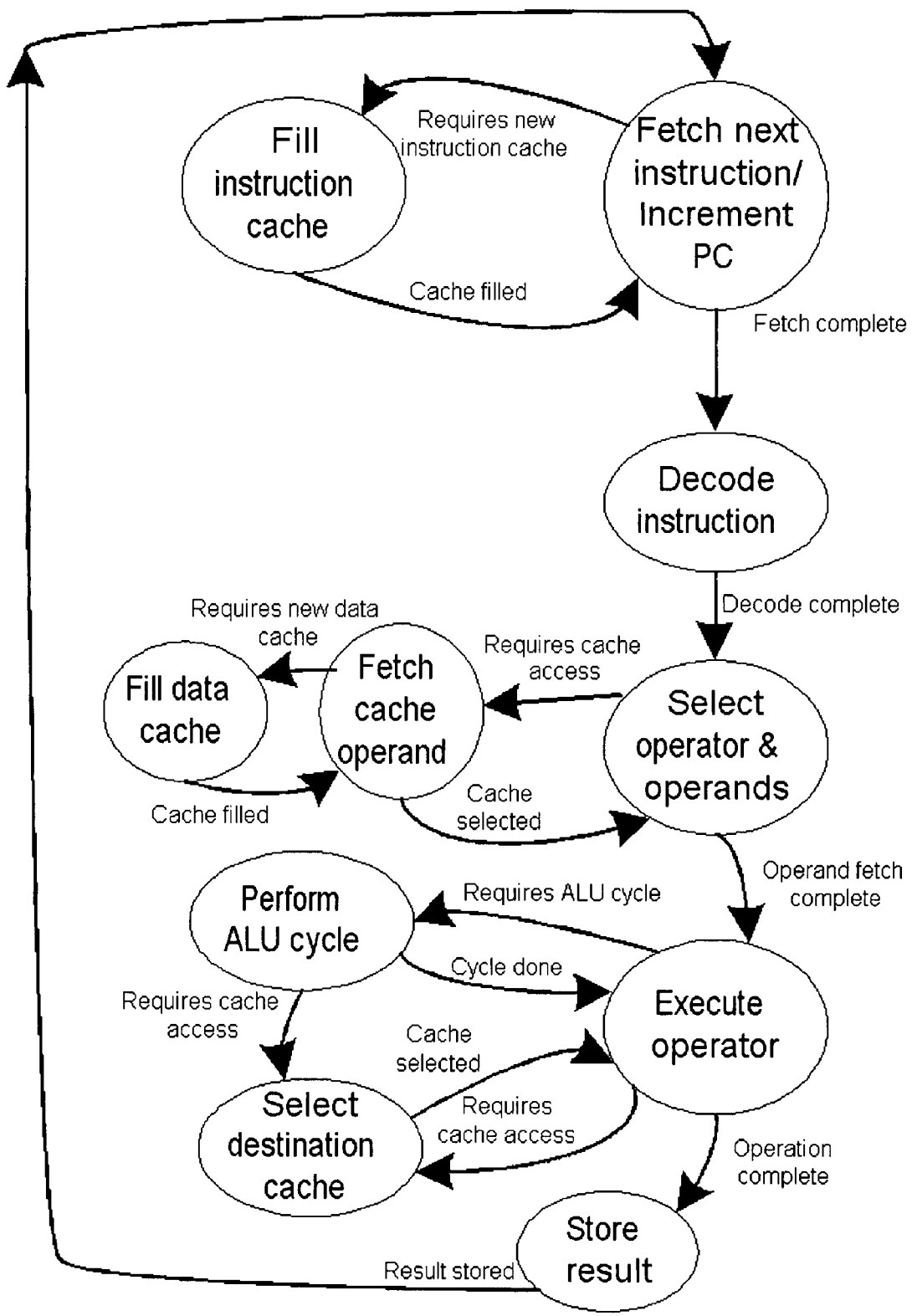
FIG. 6 depicts exemplary cache management states.

Caches may be stored and loaded based on changes of the associated memory addressing registers X, Y, PC, as illustrated in FIG. 6. For example, the total width of the PC register might be 24 bits. If the PC cache is 1024 bytes, the lower 10 bits of the PC would define access within the PC cache. When the PC is written such that there is a change in the upper 14 bits, a cache load cycle would be required. The TOMI CPU associated with that PC cache would stop executing until the cache load cycle was complete and the indicated instruction could be fetched from the PC cache.

Cache Double Buffering

A secondary cache may be loaded in anticipation of the cache load requirement. The two caches would be identical and alternately be selected and deselected based on the contents of the upper 14 bits of the PC. In the example above, when the upper 14 bits of the PC changed to match that of the data pre-cached in the secondary cache, the secondary cache would become selected as the primary cache. The old primary cache would now become the secondary cache. Since most computer programs linearly increase in memory, one embodiment of the invention would have the secondary cache always fetching the contents of the cache contents of main memory referenced by the upper 14 bits of the current PC plus 1.

The addition of secondary caches will reduce the time the TOMI processor must wait for memory data to be fetched from main memory when moving outside of the boundary of the current cache. The addition of secondary caches nearly doubles the complexity of a TOMI processor. For an optimal system, this doubling of complexity should be offset by a corresponding doubling of performance of the TOMI processor. Otherwise, two simpler TOMI processors without secondary cache can be implemented with the same transistor count.

High Speed Multiply, Floating Point Operations, Additional Functionality

Figure 7:
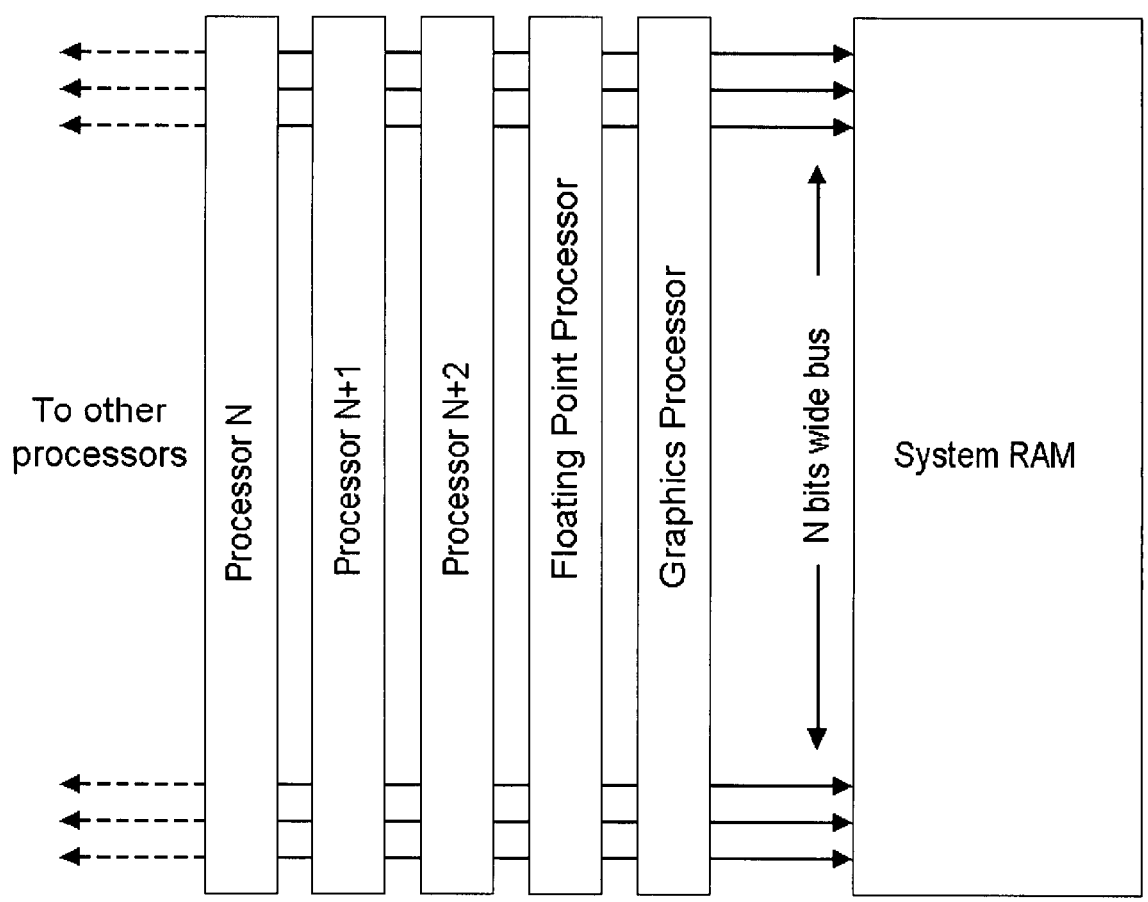
FIG. 7 shows one embodiment of additional processing functionality organized to take advantage of a wide system RAM bus.

Integer multiplication and all floating point operations require many cycles to perform, even with special purpose hardware. Thus, they should be factored into other processors rather than included in the basic TOMI processor. Digital Signal Processing (DSP) operations often use deeply pipelined multipliers that produce a result every cycle even though the total multiplication may require many cycles. For signal processing applications that repeat the same algorithm over and over, such a multiplier architecture is optimal and may be incorporated as a peripheral processor to a TOMI processor, but it would likely increase complexity and reduce overall performance if it were incorporated directly in the TOMI processor. FIG. 7 shows one example of additional processing functionality organized to take advantage of the wide system RAM bus.

TOMI Interrupt Strategy

An interrupt is an event external to the normal sequential operation of a processor that causes the processor to immediately change its sequence of operation. Examples of interrupts might be completion of an operation by an external device or an error condition by some hardware. Traditional processors go to great lengths to quickly stop normal sequential operation, save the state of current operation, begin performing some special operation to handle whatever event caused the interrupt, and when the special operation is completed restore the previous state and continue sequential operation. The primary metric of interrupt handling quality is the time to respond.

Interrupts pose several problems for traditional processors. They make execution time indeterminate. They waste processor cycles storing and then restoring status. They complicate processor design and can introduce delays that slow every processor operation.

Immediate interrupt response is unnecessary for most processors, with the exceptions being error handling and those processors directly interfacing to real world activity.

In one embodiment of a multiprocessor TOMI system, only one processor possesses primary interrupt capability. All other processors run uninterrupted until they complete some assigned work and stop themselves or until they are stopped by the coordinating processor.

Input/Output (I/O)

In one embodiment of the TOMI processor environment, a single processor is responsible for all interfacing to the external world.

Direct Memory Access (DMA) Control

In one embodiment, immediate response to the external world in a TOMI processor system occurs via a DMA controller. A DMA controller, when requested by an external device, transfers data from the external device to the internal data bus for writing to the system RAM. The same controller also transfers data from the system RAM to the external device when requested. A DMA request would have the highest priority for internal bus access.

Organizing an Array of TOMI Processors

Figure 8:
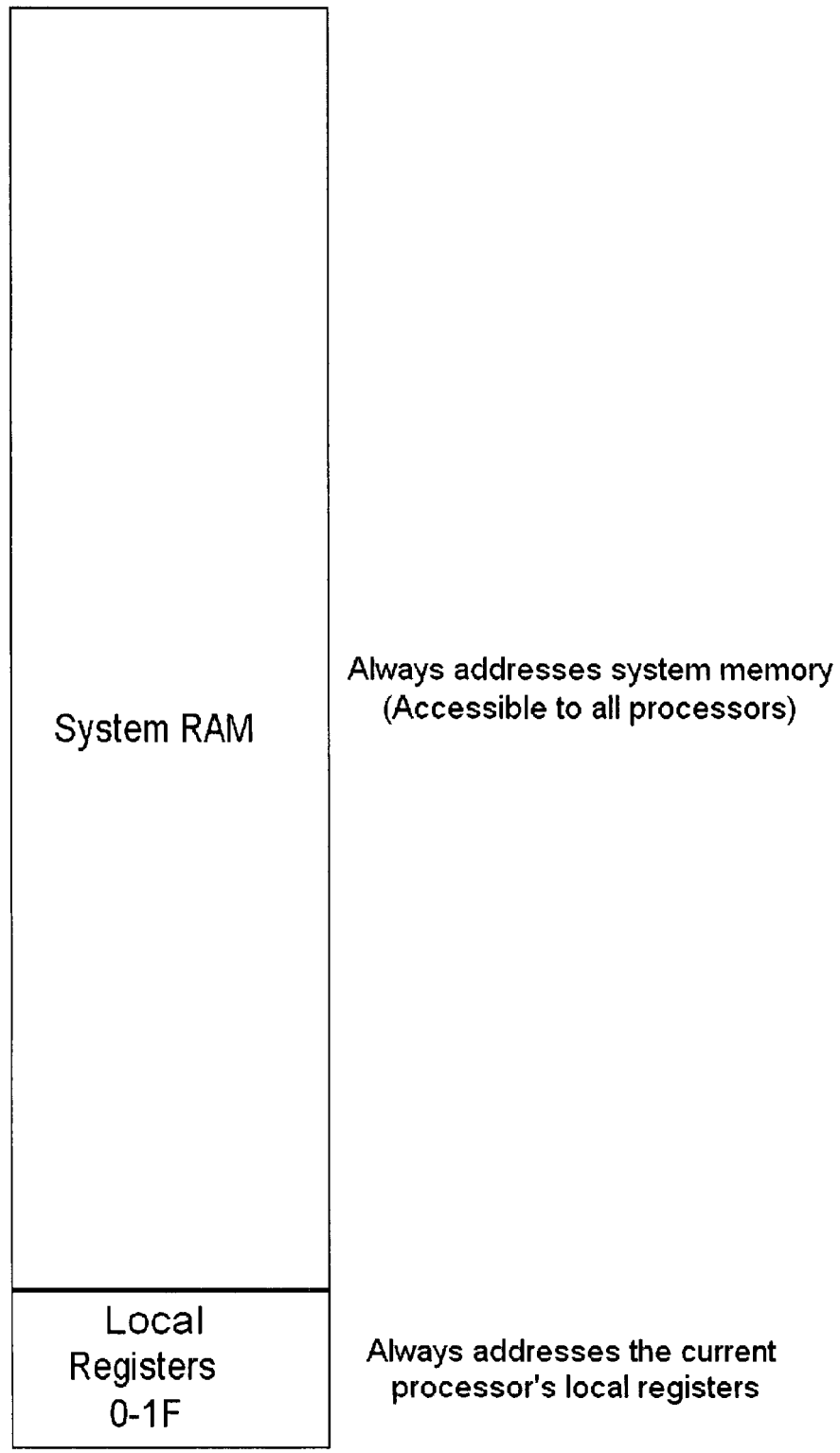
FIG. 8 depicts an exemplary memory map.

The TOMI processor of preferred embodiments of the invention is designed to be replicated in large numbers and combined with additional processing functionality, a very wide internal bus, and system memory on a monolithic chip. An exemplary memory map for such a system is illustrated in FIG. 8.

The memory map for each processor dedicates the first 32 locations (1 F hex) to the local registers for that processor (see FIG. 3). The remainder of the memory map is addressable by all processors through their cache registers (see FIG. 6). The addressability of the system RAM is limited only by the width of the three registers associated with the local caches; PC, X, and Y. If the registers are 24 bits wide, the total addressability would be 4 Mbytes, but there is no upper limit.

In one embodiment, 64 TOMI processors are implemented monolithically with memory. A single master processor is responsible for managing the other 63. When one of the slave processors is idle, it is not clocking so it consumes little or no power and generates little or no heat. On initialization, only the master processor is operational. The master begins fetching and executing instructions until a time that a thread should be started. Each thread has been precompiled and loaded into memory. To start a thread, the master allocates the thread to one of the TOMI CPUs.

Processor Availability

Coordination of the availability of TOMI processors to do work preferably is handled by the Processor Availability Table shown in FIG. 9. The coordinating (master) processor preferably can perform the following functions:

1. Push the calling parameters for a slave processor onto its stack, including but not limited to the execution address of the thread, the source memory, and the destination memory.
2. Start a slave processor.
3. Respond to a slave processor thread completion event either by polling or by responding to an interrupt.

Requesting a Processor

Figure 10:
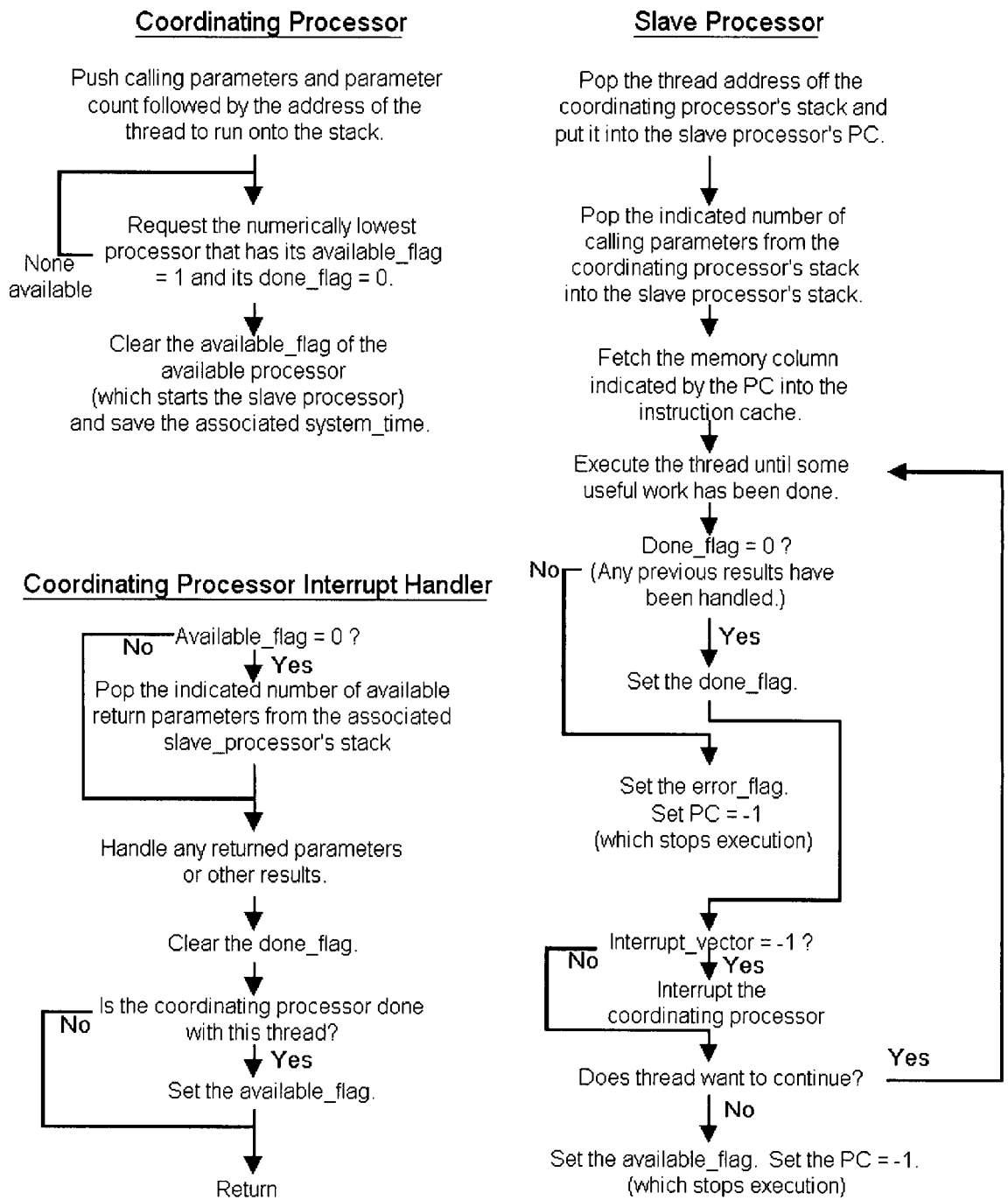
FIG. 10 illustrates three components of processor allocation.

The coordinating processor may request a processor from the availability table. The number of the lowest processor with an available_flag set to "0" is returned. The coordinating processor may then set the available_flag associated with the available processor to "1", thereby starting the slave processor. If no processor is available, the request will return an error. Alternatively, processors may be allocated by the coordinating processor based upon a priority level associated with the requested work to be performed. Techniques to allocate resources based upon priority schemes are well-known in the art. FIG. 10 illustrates three preferred components of processor allocation; Coordinating Processor initiating operations, Slave Processor operations, and Coordinating Processor result handling through interrupt response.

Step-by-Step Starting a Slave Processor

1. Coordinating processor pushes the parameters for the thread to run onto its own stack. Parameters may include: starting address of the thread, source memory for the thread, destination memory for the thread, and last parameter_count.
2. Coordinating processor requests an available processor.
3. Processor allocation logic returns either the number of the numerically lowest slave processor that has both its associated available_flag set and its associated done_flag cleared, or an error.
4. If an error was returned, the coordination processor may either retry the request until a slave processor becomes available or perform some special operation to handle the error.
5. If an available processor number was returned, the coordinating processor clears the available_flag for the indicated processor. This operation pushes the parameter_count number of stack parameters to the stack of the selected slave processor. The done_flag is cleared to zero.
6. The slave processor retrieves the top stack item and transfers it to the slave processor's program counter.
7. The slave processor then fetches the memory column indicated by the program counter into the instruction cache.
8. The slave processor begins executing instructions from the beginning of the instruction cache. The first instructions will likely retrieve the calling parameters from the stack.

9. The slave processor executes the thread from the instruction cache. When the thread completes, it checks the state of its associated done_flag. If the done_flag is set, it waits until the done_flag is cleared, indicating the coordinating processor has handled any previous results.

10. If the interrupt vector associated with the slave processor is set to −1, no interrupt will be created by setting the done_flag. The coordinating processor may therefore poll for the done_flag to be set.

When the coordinating processor detects that the done_flag is set, it may handle the slave processor's results and possibly reassign the slave processor to do new work. When the slave processor's results have been processed, the associated coordinating processor will clear the associated done_flag.

If the interrupt vector associated with the slave processor is not equal to −1, setting the associated done_flag will cause the coordinating processor to be interrupted and begin executing an interrupt handler at the interrupt vector address.

If the associated available_flag has been set also, the coordinating processor may also read the return parameters pushed on the slave processor's stack.

The interrupt handler will handle the slave processor's results and possibly reassign the slave processor to do new work. When the slave processor's results have been processed, the interrupt handler running on the coordinating processor will clear the associated done_flag.

11. If the done_flag is clear, the slave processor sets its associated done_flag and saves the new start_time. The slave processor may continue to do work or may return to the available state. To return to the available state, the slave processor may push return parameters onto its stack, followed by a stack count and set its available_flag.

Memory Locking

TOMI processors read and write system memory through their caches. A completely cached column is read or written at one time. Any processor may read any portion of system memory. An individual processor may lock a column of memory for its exclusive writing. This locking mechanism avoids memory writing conflicts between processors.

Suggested Applications

Parallelism effectively accelerates applications that may be factored into independent pieces of work for individual processors. One application that factors nicely is image manipulation for robotic vision. Image manipulation algorithms include correlation, equalization, edge identification, and other operations. Many are performed by matrix manipulation. Very often the algorithms factor nicely, as illustrated in FIG. 11.

In FIG. 11, the example imagemap shows 24 processors, with a processor allocated to manipulate the image data for a rectangular subset of the total imagemap.

Figure 12:
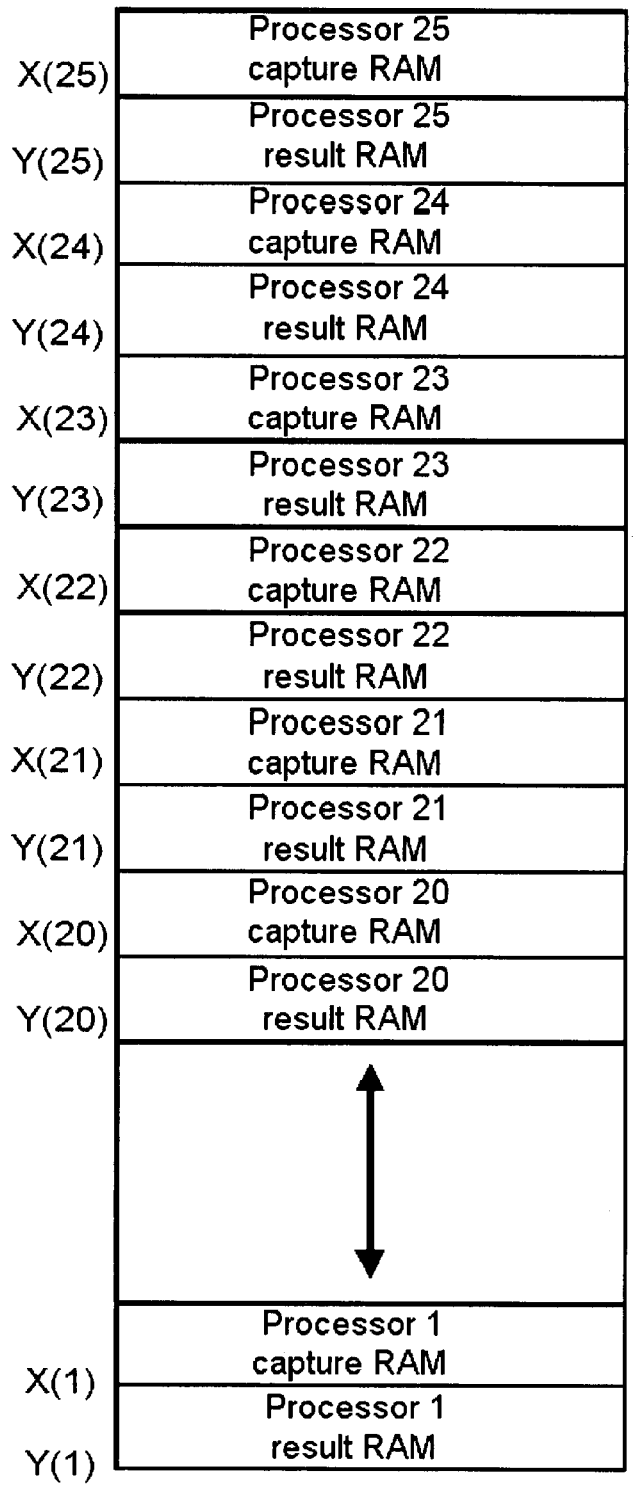
FIG. 12 depicts exemplary system RAM.

FIG. 12 shows how the TOMI system RAM may be allocated in one embodiment. One block of system RAM holds the image capture pixels, and another block holds the processed results.

In operation, the coordinating processor has allocated a DMA channel to transfer the image pixels from an external source to the internal system RAM every fixed amount of time. A typical speed of image capture might be 60 images per second.

The coordinating processor then enables slave processor 1 by pushing the address of the imagemap to be used by the X register, the address of the processed image to be used by the Y register, the parameter count of 2, and the address of the image processing algorithm. The coordinating processor subsequently and similarly enables processors 2 through 25. The processors continue to execute independently and in parallel until the image processing algorithm is completed.

When the algorithm is completed, each processor sets its associated done_flag in the Processor Availability Table. The results are handled by the coordinating processor, which is polling for completion or responding to an interrupt on the "done" event.

Figure 13:
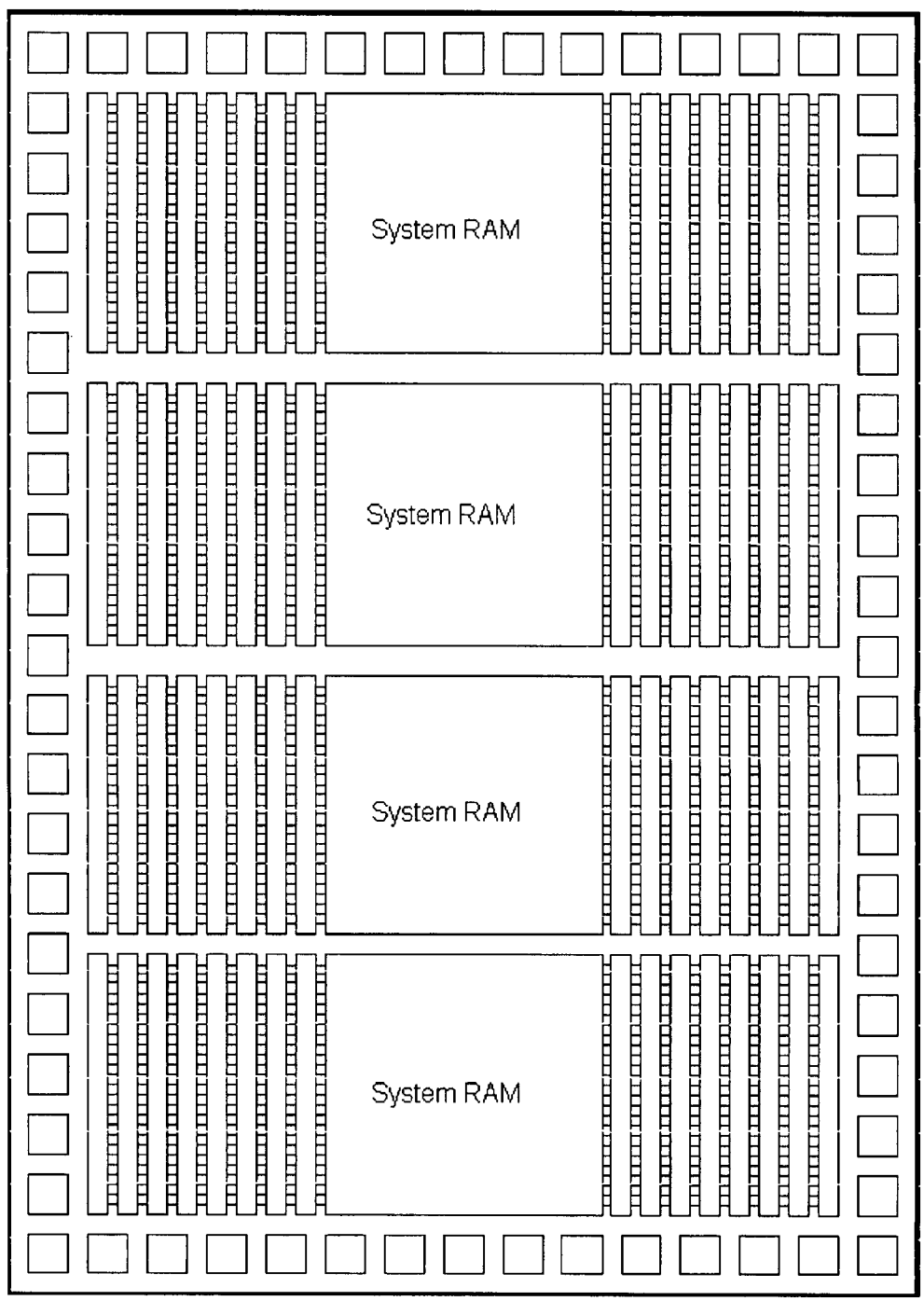
FIG. 13 depicts an exemplary floorplan for a monolithic array of 64 processors.

FIG. 13 shows an exemplary floorplan for a monolithic array of 64 processors.

It will be appreciated that the present invention has been described by way of example only and with reference to the accompanying drawings, and that improvements and modifications may be made to the invention without departing from the scope or spirit thereof.

What is claimed is:

1. A system comprising: at least one general purpose processor having an instruction set consisting essentially of seven instructions including LOADI, X; LOADACC, Y; STOREACC, Y; ADD, Y; AND, Y; XOR, Y; and INC, Y; embedded in RAM (random access memory) on a single chip; wherein said random access memory is accessible by said at least one general purpose processor, and wherein said at least one general purpose processor comprises at least one local cache associated with at least one dedicated memory addressing register whose least significant address bits are memory addresses to each relative byte of its associated said local cache, and the remaining most significant address bits are operable to initiate a cache load when said remaining most significant address bits are changed during processing when any said at least one dedicated memory addressing register is written.

2. A system as in claim 1, wherein the size of each said local cache is equivalent to one row of said random access memory on said chip.

3. A system as in claim 1, wherein at least three specific memory addressing registers with associated said local caches include an instruction register, source register, and destination register.

4. A system as in claim 1, wherein said instruction set comprises functionality necessary to perform operations of a general purpose computer, including loads, stores, sequencing, math, logic, rapid screen refresh, compiling source code, and searching a database.

5. A system as in claim 1, wherein each said processor is operable to process a single thread.

6. A system as in claim 1, wherein an accumulator is an operand for every instruction, except an increment instruction.

7. A system as in claim 1, wherein a destination for each instruction is always an operand register.

8. A system as in claim 1, wherein three registers auto-increment and three registers auto-decrement.

9. A system as in claim 4, wherein each instruction requires only one clock cycle to complete.

10. A system as in claim 4, wherein said instruction set comprises no BRANCH instruction and no JUMP instruction.

11. A system as in claim 4, wherein each instruction is at most 8 bits in length.

12. A system as in claim 1, wherein a single master processor is responsible for managing each said processor.

13. A system comprising: a plurality of parallel general purpose processors embedded in RAM (random access memory) on a single chip; wherein said random access memory is accessible by at least one of said processors, and wherein at least one of said processors is operable to process an instruction set optimized for thread-level parallel processing consisting essentially of seven instructions including LOADI, X; LOADACC, Y; STOREACC, Y; ADD, Y; AND, Y; XOR, Y; and INC, Y; and wherein at least one of said processors comprises at least one local cache dedicated to at least one specific memory addressing register whose least significant address bits are memory addresses to each relative byte of its associated said local cache, and the remaining most significant address bits are operable to initiate a cache load when said most significant address bits are changed during processing when said at least one specific memory addressing register is written.

14. A system as in claim 13, wherein the size of each of said at least one local cache is equivalent to one row of said random access memory on said chip.

15. A system as in claim 13, wherein said at least one specific memory addressing register further comprises an instruction register, a source register, and a destination register.

16. A system as in claim 13, wherein a 32-bit CPU version of said system is implemented in fewer than 1,500 gates.

17. A system as in claim 13, wherein each of said processors is operable to process a single thread.

18. A system as in claim 13, wherein a single master processor is responsible for managing each of said parallel processors.

19. A system as in claim 13, wherein said instruction set comprises functionality necessary to perform operations of a general purpose computer, including loads, stores, sequencing, math, logic, rapid screen refresh, compiling source code, and searching a database.

20. A method of thread-level parallel processing utilizing a plurality of parallel processors embedded in RAM on a single chip, wherein each of said plurality of processors is operable to process an instruction set consisting essentially of seven instructions including LOADI, X; LOADACC, Y; STOREACC, Y; ADD, Y; AND, Y; XOR, Y; and INC, Y, and to process a single thread, comprising: (a) allocating local caches to each of three specific memory addressing registers whose least significant address bits are memory addresses to each relative byte of its associated said local cache in each of said plurality of processors; (b) allocating one of the plurality of processors to process each thread; (c) processing each allocated thread by said plurality of processors, and when the contents of the remaining most significant address bits of any of said memory addressing registers change when a dedicated memory addressing register is written, initiate a cache load cycle; (d) processing the results from each thread processed by said plurality of processors; and (e) de-allocating each of said plurality of processors after each thread has been processed.

21. A method as in claim 20, wherein said instruction set comprises functionality necessary to perform operations of a general purpose computer, comprising loads, stores, sequencing, math, logic, running a video game with a rapid screen refresh, compiling a large source file, and searching a database.

22. A method as in claim 20, wherein each instruction in the instruction set is at most 8 bits in length.

23. A method as in claim 20, wherein each instruction in the instruction set is processed in one clock cycle.

* * * * *